United States Patent
Hosch

(10) Patent No.: US 10,102,310 B2
(45) Date of Patent: Oct. 16, 2018

(54) PRECISE OBJECT MANIPULATION SYSTEM AND METHOD

(71) Applicant: SIEMENS PRODUCT LIFECYCLE MANAGEMENT SOFTWARE INC., Plano, TX (US)

(72) Inventor: Kenneth A. Hosch, Redondo Beach, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 671 days.

(21) Appl. No.: 14/707,792

(22) Filed: May 8, 2015

(65) Prior Publication Data

US 2016/0328491 A1 Nov. 10, 2016

(51) Int. Cl.
*G06F 17/50* (2006.01)
*G06F 3/048* (2013.01)
*G06F 3/0484* (2013.01)
*G06F 3/0488* (2013.01)
*G06F 3/033* (2013.01)
*G06F 3/0485* (2013.01)

(52) U.S. Cl.
CPC .............. *G06F 17/50* (2013.01); *G06F 3/048* (2013.01); *G06F 3/04842* (2013.01); *G06F 3/033* (2013.01); *G06F 3/04855* (2013.01); *G06F 3/04883* (2013.01); *G10H 2220/106* (2013.01)

(58) Field of Classification Search
None
See application file for complete search history.

(56) References Cited

U.S. PATENT DOCUMENTS

| | | | | |
|---|---|---|---|---|
| 5,186,629 A * | 2/1993 | Rohen | ..................... | G06F 3/016 340/4.12 |
| 5,757,358 A * | 5/1998 | Osga | ................... | G06F 3/04842 345/157 |
| 5,847,694 A * | 12/1998 | Redford | ................... | A63F 13/06 345/158 |
| 5,872,559 A * | 2/1999 | Shieh | .................... | G06F 3/0488 178/18.01 |
| 6,067,079 A * | 5/2000 | Shieh | .................... | G06F 3/0488 345/156 |
| 6,256,039 B1 * | 7/2001 | Krishnamurthy | ....... | G06T 15/00 345/419 |
| 6,300,936 B1 * | 10/2001 | Braun | .................... | G05B 19/00 345/156 |

(Continued)

*Primary Examiner* — Kibrom K Gebresilassie

(57) ABSTRACT

A system having a processor is provided that visually manipulates objects displayed on a touch screen or other display device responsive to inputs through the touch screen or other input device. The processor causes a display of a plurality of selectable candidate directions of constraint with respect to a movable portion of an object on a workspace. Responsive to a selection of one of the directions of constraint and motion inputs at input positions on the workspace that are spaced apart from the movable portion, the processor causes the movable portion to move along a path only in directions corresponding to the selected directions of constraint with an amount of motion produced from the motion inputs that is based at least in part on a distance between the input positions and the movable portion along a direction normal to the selected directions of constraint.

20 Claims, 10 Drawing Sheets

(56) References Cited

U.S. PATENT DOCUMENTS

| | | | | |
|---|---|---|---|---|
| 6,480,813 B1* | 11/2002 | Bloomquist | ........ | G06F 3/04842 |
| | | | | 345/662 |
| 7,168,042 B2* | 1/2007 | Braun | .................... | G05B 19/00 |
| | | | | 345/156 |
| 8,572,513 B2 | 10/2013 | Chaudhri et al. | | |
| 9,135,730 B2* | 9/2015 | Fang | ........................ | G06T 17/30 |
| 9,164,670 B2* | 10/2015 | Lobo | ..................... | G06F 3/0485 |
| 9,383,887 B1* | 7/2016 | Khafizov | .............. | G06F 3/0482 |
| 9,405,400 B1* | 8/2016 | Khafizov | .............. | G06F 3/0418 |
| 9,775,682 B2* | 10/2017 | Quaid | .................... | A61B 34/30 |
| 2003/0210286 A1* | 11/2003 | Gerpheide | .......... | G06F 3/04847 |
| | | | | 715/863 |
| 2004/0174362 A1* | 9/2004 | Celniker | ................. | G06T 17/30 |
| | | | | 345/441 |
| 2005/0094205 A1* | 5/2005 | Lo | ......................... | G06F 17/212 |
| | | | | 358/1.18 |
| 2005/0094206 A1* | 5/2005 | Tonisson | ............... | G06F 17/211 |
| | | | | 358/1.18 |
| 2005/0094207 A1* | 5/2005 | Lo | ......................... | G06F 17/243 |
| | | | | 358/1.18 |
| 2007/0226656 A1* | 9/2007 | Zwart | ..................... | G06F 3/038 |
| | | | | 715/856 |
| 2008/0154555 A1* | 6/2008 | Qu | ........................... | G06K 9/32 |
| | | | | 703/2 |
| 2010/0044121 A1* | 2/2010 | Simon | ................. | G06F 3/03547 |
| | | | | 178/18.03 |
| 2011/0032192 A1* | 2/2011 | Mills | ................... | G06F 3/04847 |
| | | | | 345/173 |
| 2014/0066802 A1* | 3/2014 | Kaula | ................. | A61B 5/7475 |
| | | | | 600/554 |
| 2014/0194162 A1* | 7/2014 | Tsudik | ................. | G06F 1/1694 |
| | | | | 455/566 |

* cited by examiner

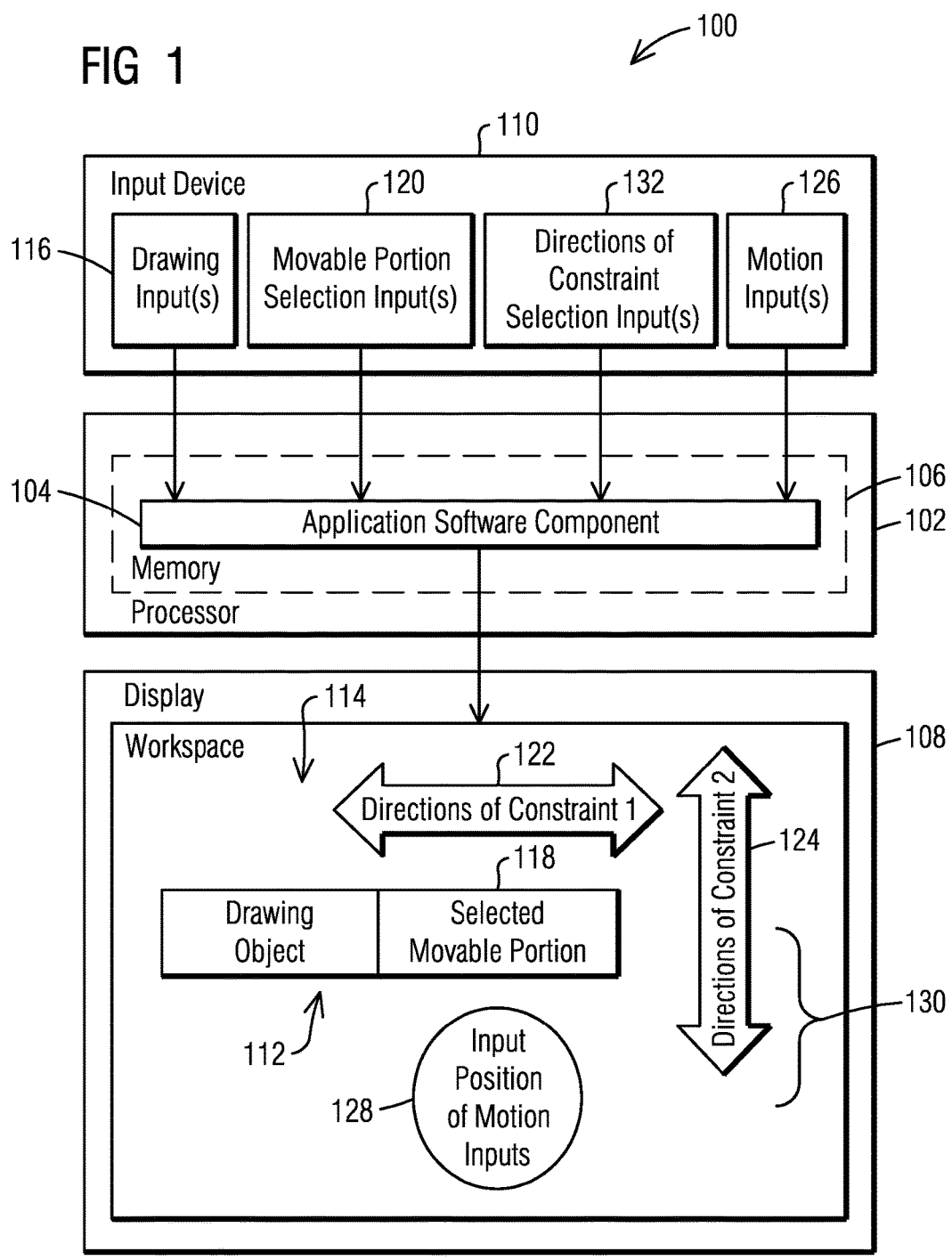

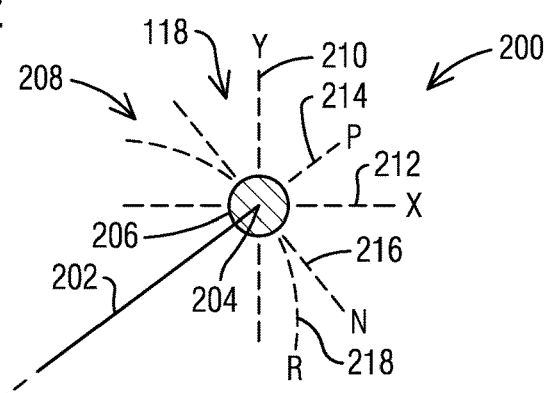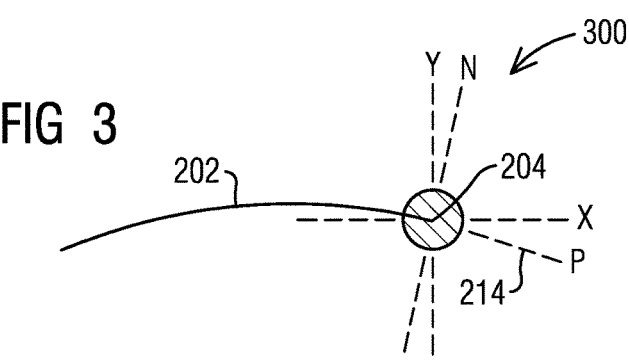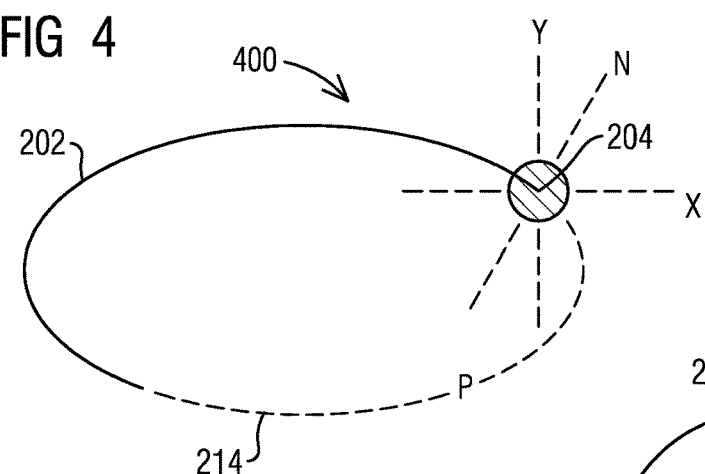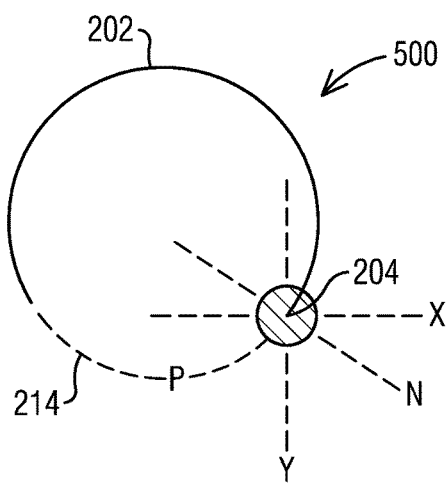

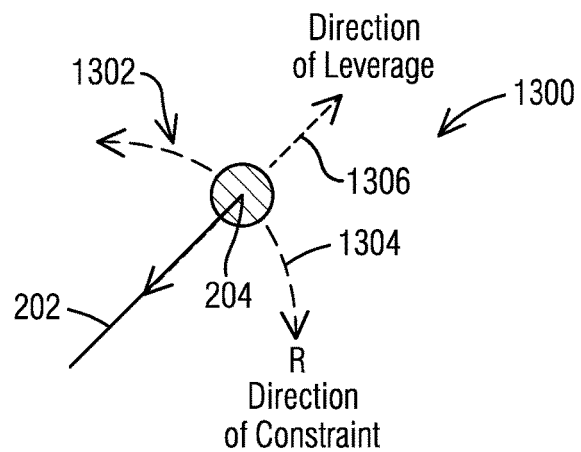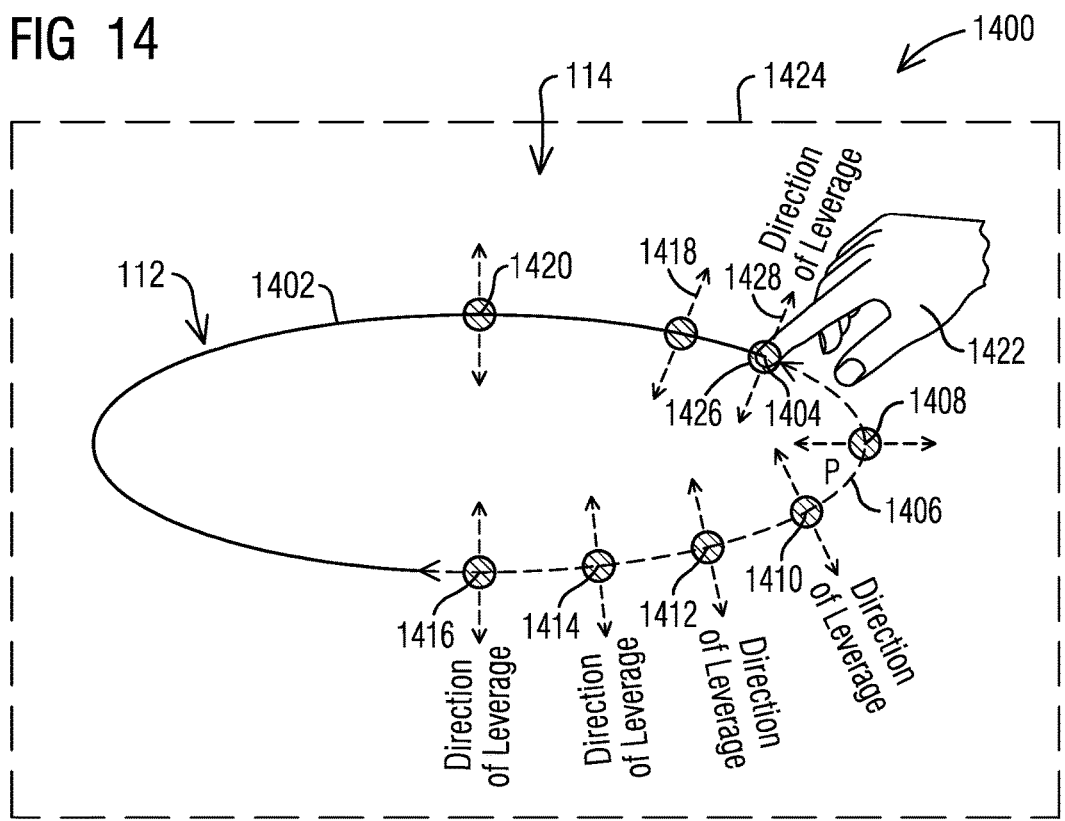

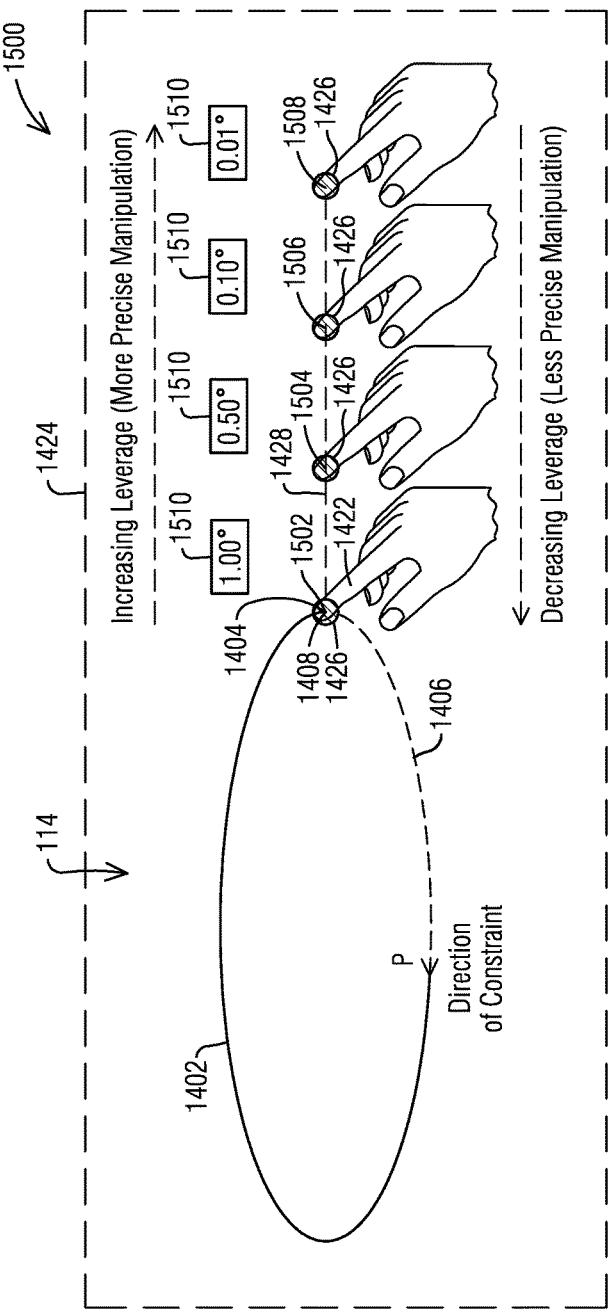

PRECISE OBJECT MANIPULATION SYSTEM AND METHOD

TECHNICAL FIELD

The present disclosure is directed, in general, to computer-aided design, visualization, and manufacturing systems, product data management (PDM) systems, product lifecycle management ("PLM") systems, and similar systems, that are used to create and manage data for products and other items (collectively referred to herein as product systems).

BACKGROUND

Computer-aided design (CAD) systems and other types of drawing systems may include a graphical user interface (GUI) through which drawings of products may be created. Such graphical user interfaces may benefit from improvements.

SUMMARY

Variously disclosed embodiments include systems and methods that may be used to draw objects in a CAD system or other type of drawing system. In one example, a system may comprise at least one processor. The at least one processor may be configured to cause a display device to display a plurality of selectable candidate directions of constraint with respect to a selected movable portion of an object on a workspace. Responsive to a selection of one of the directions of constraint and motion inputs through an input device at input positions on the workspace that are spaced apart from the movable portion, the at least one processor causes the movable portion to move along a path only in directions corresponding to the selected directions of constraint with an amount of motion produced from the motion inputs that is based at least in part on a distance between the input positions and the movable portion along a direction normal to the selected directions of constraint.

In another example, a method may include various acts carried out through operation of at least one processor. Such a method may include causing a display device to display a plurality of selectable candidate directions of constraint with respect to a selected movable portion of an object on a workspace. The method may also include responsive to a selection of one of the directions of constraint and motion inputs through an input device at input positions on the workspace that are spaced apart from the movable portion, causing the movable portion to move along a path only in directions corresponding to the selected directions of constraint with an amount of motion produced from the motion inputs that is based at least in part on a distance between the input positions and the movable portion along a direction normal to the selected directions of constraint.

A further example may include non-transitory computer readable medium encoded with executable instructions (such as a software component on a storage device) that when executed, causes at least one processor to carry out this describe method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the Detailed Description below, it may be advantageous to set forth definitions of certain words or phrases that may be used throughout this patent document. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example a processor that is configured to carry out a function/process may correspond to a processor that is actively executing the software/firmware which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may correspond to a processor circuit particularly fabricated or "wired" to carry out the functions or processes (e.g., an ASIC or FPGA design).

The term "adjacent to" may mean: that an element is relatively near to but not in contact with a further element; or that the element is in contact with the further portion, unless the context clearly indicates otherwise.

Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIG. 1 illustrates a functional block diagram of an example system that facilitates object traversal.

FIGS. 2-8 illustrate examples of an input object that is manipulated.

FIGS. 9-13 illustrate examples of indicia that may be displayed for a line segment when different directions of constraint are selected.

FIGS. 14 and 15 illustrate examples of how a touch screen 924 may be used to draw a curved line with varying amounts of precision.

DETAILED DESCRIPTION

Figure 6:
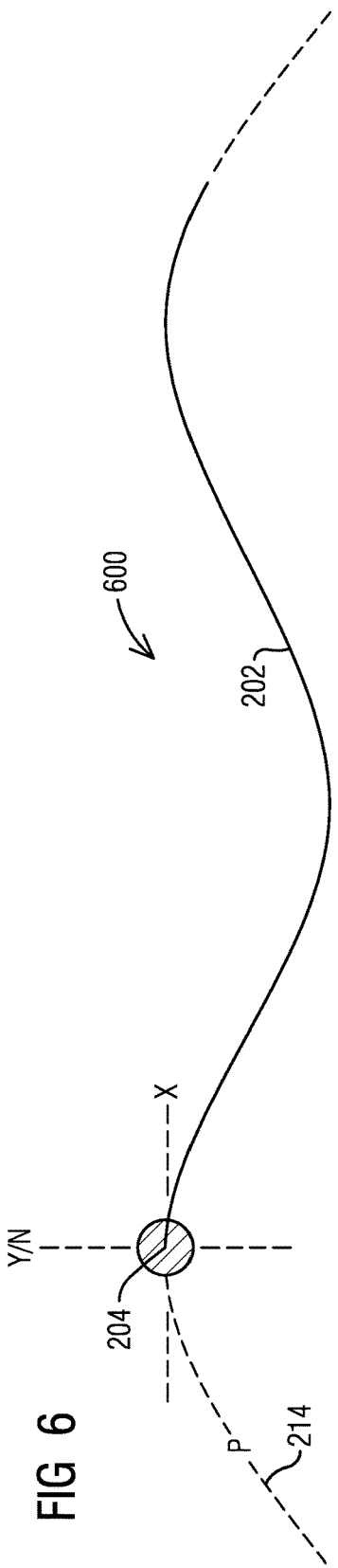
Figure 8:
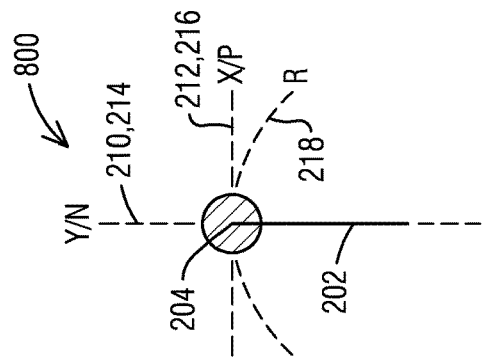
Figure 7:
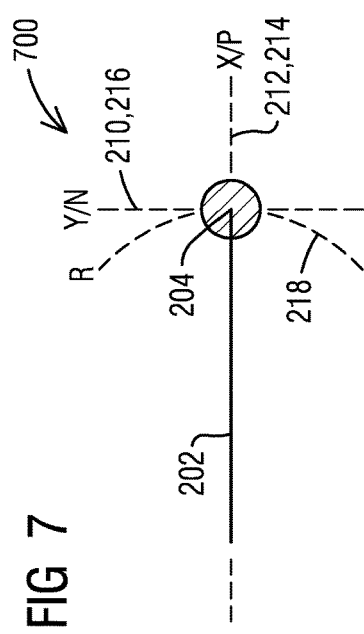

Various technologies that pertain to drawing systems will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system components may be performed by multiple components. Similarly, for instance, a component may be configured to perform functionality that is described as being carried out by multiple components. The numerous innovative teachings of the present application will be described with reference to exemplary non-limiting embodiments.

Many forms of drawing systems (such as CAD systems) are operative to manipulate various types of visual objects. Such visual objects may include geometric primitives such as straight line segments, arcs, curves, and splines. Such visual objects may also include 2-D and 3-D shapes such as circles, squares, rectangles, spheres, cones, cylinders, cubes, and cuboids. Such visual objects may also include combinations of simpler visual objects to form complex 2-D or 3-D structures. In addition, other types of visual objects may include images and text boxes. Thus in general, a visual object may correspond to any type of graphical object that can be displayed through a display device (such as a display screen) that is capable of being visually manipulated via inputs through an input device with respect to shape, size, orientation, and/or position.

With reference to FIG. 1, an example system 100 that facilitates drawing and manipulating objects is illustrated. The system 100 may include at least one processor 102 that is configured to execute one or more application software components 104 from a memory 106 in order to carry out the various features described herein. The application software component 104 may include a drawing software application or a portion thereof such as a CAD software application. Such a CAD software application may be operative to produce a CAD drawing based at least in part on inputs provided by a user.

An example of CAD/CAM/CAE software that may be adapted to include at least some of the functionality described herein includes the NX suite of applications that is available from Siemens Product Lifecycle Management Software Inc. (Plano, Tex.). However, it should also be understood that such a drawing software application may correspond to other types of drawing software, including vector based illustration software, presentation software, diagramming software, word processing applications, games, visual programming tools, and/or any other type of software that involves drawing and manipulation of objects.

The described system may include at least one display device 108 (such as a display screen) and at least one input device 110. For example, the processor 102 may be integrated into a housing that includes a touch screen that serves as both an input and display device. Examples of such systems may include mobile phones, tablets, and notebook computers. However, it should be appreciated that example embodiments may use other types of input and display devices. For example, systems may include display devices with display screens that do not include touch screens, such as an LCD monitor or a projector. Further, systems may use other types of input devices to provide inputs for manipulating objects such as a mouse, pointer, touch pad, drawing tablet, track ball, joystick, keypad, keyboard, camera, motion sensing device, or any other type of input device capable of providing the inputs described herein.

Further it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device for example may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a processor of the server.

In an example embodiment, the processor 102 may be configured (such as via the described application software component 104) to cause the display device 108 to draw visual objects 112 on a workspace 114 responsive to drawing inputs 116 received through the input device 110. Such a workspace 114 may correspond to a two-dimensional background surface on which objects are drawn, displayed, and manipulated in a graphical user interface of the application software component 104. However, it should also be appreciated that for 3-D drawings, the workspace may correspond to a two dimensional view of a three dimensional space in which objects are visually drawn, displayed, and manipulated using the graphical user interface of the application software component 104. Also in other examples, 3-D displays may be used to render 3-D drawings in a 3-D workspace.

As schematically illustrated in FIG. 1, such an object 112 may include at least one movable portion 118. For example, a line segment placed on the workspace 114 may include two end points that correspond to movable portions. In an example embodiment, the application software component may cause the processor to enable one the movable portions 118 of the object 112 to be selected in response to a movable portion selection input 120 received through the input device 110. For a movable portion such as an end of a line segment, the selected end point may be moved horizontally and/or vertically on the display device 108 (while the other end portion remains stationary) to change both the length of the line segment and its orientation.

In order to precisely control the movement of such a movable portion on the workspace, the application software component 104 executing in the processor 102 may cause the processor to display a plurality of selectable candidate directions of constraint 122, 124 with respect to the movable portion 118 of the object 112 on the workspace 108. Each of the selectable candidate directions of constraint is associated with a respective different direction (which may be linear or curved), along which the application component is operative to limit movement of the movable portion while the respective directions of constraint is selected. Limiting the movement of a movable portion in this manner, enables a user to precisely move an end portion of a line or other portion of an object in a particular desired direction and thereby prevent accidental movement of the end portion in a different direction.

In an example embodiment, such selectable candidate directions of constraint 122, 124 may be displayed on the workspace is positions adjacent to the selected movable portion. In this context the term adjacent corresponds to the selectable candidate directions of constraint being in contact with the selected movable portion and/or sufficiently close to the selected movable portion so that it is visually apparent that the selectable candidate directions of constraint 122, 124 are associated with the selected movable portion 118. However, in alternative embodiments such selectable candidate directions of constraint may be displayed in other locations on the workspace or GUI of the application software component 104 (e.g., in a ribbon, window, menu, tab or other location).

When one of the directions of constraints is selected via a selection input 132, a user may provide motion inputs 126 through the input device in the selected directions of constraint that cause the selected movable portion 118 to move relative to the workspace 114. For a touch screen, such motion inputs may correspond to the user touching the touch screen with their finger (or a stylus) and dragging their finger (or stylus) along the touch screen in one of the selected directions of constraint in order to cause the movable portion 118 to move in the same one of the selected directions of constraint. For a mouse type of input device, such motion inputs may correspond to the user pressing and holding down a mouse button with their finger and dragging the mouse in a direction that moves a mouse pointer displayed on the display device in one of the selected directions of constraint in order to cause the movable portion 118 to move in the same one of the directions of constraint.

In these examples, such motion inputs may be associated with input positions 128 at particular coordinates on the workspace 114 that are located on or are spaced apart (horizontally and/or vertically) from the position/coordinates of the selected movable portion 118. Such input positions 128 may correspond to the particular location a user touches a touch screen with their finger (or a stylus). For a mouse input device, such input positions 128 may correspond to the position of the mouse pointer. In addition, as will be explained in more detail below, an amount of motion of the movable portion produced from such motion inputs may based at least in part on a distance 130 between the movable portion 118 and the input positions 128 along a direction normal to the particular selected directions of constraint (e.g., horizontal constraints 122).

FIGS. 2-8 illustrate examples of an input object that is manipulated in this described manner. For example, FIG. 2 shows an example 200 of an object 112 in the form of a line segment 202 having a movable portion 118 in the form of an end point 204 on the line. When the end point is selected (via an input through the input device) the described application software component may cause the end point 204 to be displayed with additional indicia 206 (such as a small circle that serves as a visual cue that the end point 204 has been selected).

In addition, the application software component 104 may cause a plurality of selectable candidate directions of constraint 208 to be displayed adjacent the end point 204. In this example, such selectable candidate directions of constraint may include visual indicia depicting the corresponding directions on the workspace. For example, a selectable vertical directions of constraint 210 may include vertical directions, and the corresponding visual indicia may correspond to a vertical broken line axis labeled with a letter Y that passes through the end point 204. Also for example, a selectable horizontal directions of constraint 212 may include horizontal directions, and the corresponding visual indicia may correspond to a horizontal broken line axis labeled with a letter X that passes through the end point 204.

Further, a selectable along path directions of constraint 214 may include directions that correspond to a path that follows along the existing line and along a natural continuation of the line in a pattern consistent with its shape. The corresponding visual indicia may correspond to a broken line labeled with a letter P that passes through the end point 204. For such directions of constraint, the application software component executing in the processor may cause the processor to determine this path based on the type of the object. For example, for a line (as shown in FIG. 2), such an along path directions of constraint 214 may correspond to a path that is coincident with the line. As depicted in the views 300, 400, 500, 600 in FIGS. 3-6, for objects 204 that are curved lines, such an along path directions of constraint 214 may correspond to a path that is coincident with the curve of the line and that extends outwardly from the end point 204 of the line with the same curvature pattern as the line (i.e., circular, elliptical, sinusoidal).

In addition as shows in FIG. 2, a selectable normal directions of constraint 216 may include directions normal to the selectable along path directions of constraint 214 and the corresponding visual indicia may correspond to a broken line with a letter N that passes through the end point 204. Also, it should be appreciated that for some orientations of objects, directions of constraint may overlap with each other. For example, as illustrated in views 700, 800 in FIGS. 7 and 8, for a horizontally or vertically orientated straight line segment, the vertical and horizontal selectable directions of constraint 210, 212 may overlap with the determined selectable along path and normal directions of constraint 214, 216.

Also as shown in FIG. 2, selectable radial directions of constraint 218 may include directions that correspond to a circular path along which the movable portion may follow. In this example, the object (such as a line segment 202 in FIGS. 2, 7 and 8) may serve as a radial arm with a fixed length that pivots with respect to a further portion of the object (e.g., the opposite end of the line that was not selected to move or some other pivot point in the structure being drawn/manipulated). The corresponding visual indicia for the selectable radial direction of constraint 218 may correspond to a broken line labeled with a letter R that passes through the end point 204. For such selectable directions of constraint, the application software component executing in the processor may cause the processor to determine this circular path based on the type of the object and/or the manner in which the object is connected to other objects in the drawing.

In an example embodiment with a touch screen, one of the candidate directions of constraint may be selected by a user touching/taping with their finger or a stylus, a portion of the displayed indicia associated with the desired directions of constraint. In an example with a mouse, a user may click on the desired indicia to select the associated directions of constraint. For example a user could tap or click on the letter "X" to select a horizontal directions of constraint. However, it should be appreciated that other types of inputs may be used to select one of the directions of constraint from the plurality of candidate directions of constraint that are presented on the display device.

Once a directions of constraint has been selected, the application software component may cause the processor to cause the display device to visually emphasize which of the candidate directions of constraint was selected. For example, this may be done by removing the display of indicia for the non-selected candidate directions of constraint, such that only the indicia for the selected directions of constraint is displayed. The selected directions of constraint may be made relatively more visually distinctive compared to the non-selected candidate directions of constraint (e.g., by make the indicia for the selected directions of constraint relatively bolder, thicker, darker, and/or larger).

Figure 9:
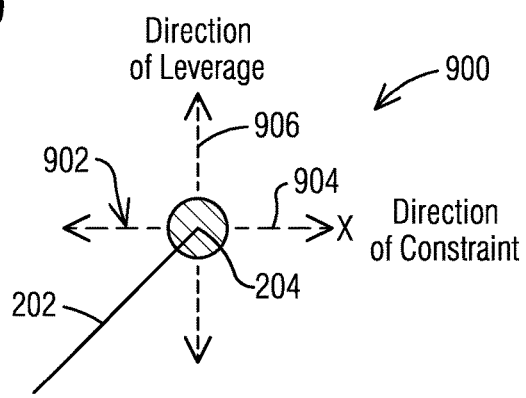
Figure 10:
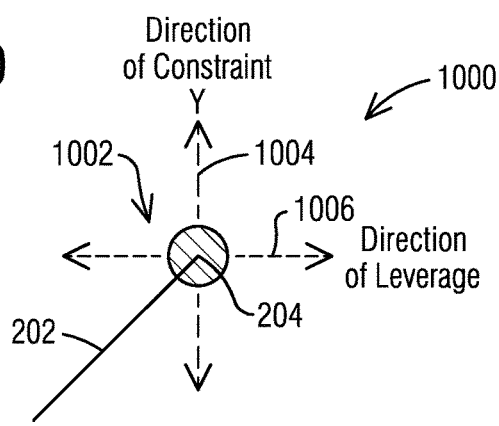
Figure 11:
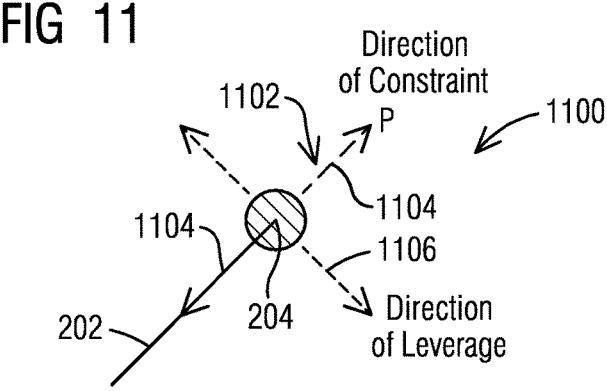
Figure 12:
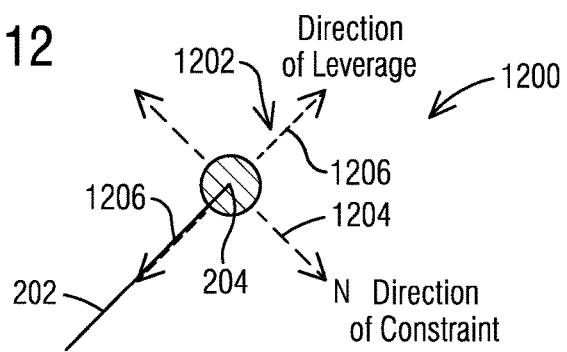

FIGS. 9-13 illustrate example views 900, 1000, 1100, 1200, and 1300 of indicia that may be displayed for the line segment 202 when different directions of constraint are selected. FIG. 9 shows indicia 902 for a selected horizontal directions of constraint, showing a horizontal path 904 with a broken line (labeled with an "X") extending to each side of the selected end point 204 (i.e., the selected movable portion). Also, FIG. 10 shows indicia 1002 for a selected vertical directions of constraint, showing a vertical path 1004 with a broken line (labeled with a "Y") extending vertically above and below the movable end point 204. In addition, FIG. 11 shows indicia 1102 for a selected along path directions of constraint, showing a path 1104 axially aligned with the line segment 202 (labeled with a "P") and extending outwardly of the movable end point 204. Further, FIG. 12 shows indicia 1202 for a selected normal directions of constraint, showing a path 1204 normal to the line segment 202 (labeled with an "N") and extending outwardly of the movable end point 204. Also, FIG. 13 shows indicia 1302 for a selected radial directions of constraint, showing a circular path 1304 (labeled with an "R") and extending outwardly of the movable end point 204.

In these examples, the indicia for the non-selected candidate directions of constraint have been removed from the workspace being displayed. However, in other embodiments, they may remain (relatively lighter, less bold, and/or smaller than the indicia for the selected directions of constraint 902-1302).

In addition, in example embodiments, the application software component may be operative to cause the processor to cause the display device to display further path indicia 906, 1006, 1106, 1206, 1306 that extends from the movable portion in at least one direction normal to the broken line path indicia 904, 1004, 1104, 1204, 1304 corresponding to the selected directions of constraint. Such further path indicia may visually display the direction a finger, mouse input, or stylus may move in order to increase/decrease the degree of precision used to move the selected movable portion (e.g., the end point 204) in the directions of constraint.

In example embodiments, the degree of precision may correspond to a virtual form of leverage in which larger distances (similar to a longer lever) provide higher degrees of leverage. In examples provided herein, the degree of leverage corresponds to a degree of precision that is used to move the selected movable portion. Such variable control over precision using a virtual form of leverage allows a user to intuitively change between fine or coarse movements for the movable portion of the object while moving the movable portion of the object.

FIG. 14 illustrates an example 1400 of how a finger 1422 on a touch screen 1424 (or other input method) may be used to draw a curved line with varying amounts of precision. In this example, the user has previously selected and placed a drawing object 112 in the form of a curved line 1402 for an ellipse shape on the workspace 114. Movement of the movable portion (end point) 1404 of the curved line (without any constrains on direction) in different vertical and horizontal directions may be carried out to increase the size, width, height, and completeness of the ellipse. In this example, the along path directions of constraint has been selected. Thus movement of the end point 1404 is constrained by the application software component to only follow along a broken line path 1406 that is defined by the shape of the ellipse.

In this example, the application software component is operative to determine the broken line path indicia 1406 to display based on the type of the selected object (e.g., an ellipse) and the current geometry (i.e., major and minor axis) of the ellipse. As a result in this example, the path indicia 1406 corresponds to a continuation of the portions of the ellipse that has not yet been drawn. Also, it should be appreciated that in this example, the path 1406 coincides with the existing portions of the drawn curved line 1402.

Thus with an along path directions of constraint, the end point 1404 is constrained to move either clockwise along the path indicia 1406 (to positions 1408, 1410, 1412, 1414, 1416) to further complete the ellipse or counterclockwise along the curved line 1402 (to positions 1418, 1420) to remove portions of the curved line 1402 that have already been drawn for the ellipse shape. In this example, the application software component may cause pointer indicia 1426 such as a circle (or a cross-hair or other indicia) to be displayed at the input positions that the user contacts the touch screen to move the end point 1404 of the curved line 1402. In addition, the application software component may also cause the previously described further path 1428 to extend outwardly from the movable portion (end point) 1404 in directions normal to the path 1406.

As illustrated in FIG. 14, for directions of constraint that follow a curved path, the indicia for the further path 1428 will be orientated at different angles (and positions) depending on the current location of the movable portion (end point) 1404 of the line being drawn. Thus, at position 1416, the further path is displayed vertically in this example, while it is displayed horizontally at position 1408.

In this example, the application software component may also be operative to illustrate displacement of this pointer indicia 1426 away from the end point 1404 as a user moves their finger normal to the path 1406. For example, FIG. 15 illustrates a further view 1500 of the curve 1402 in which a user has moved their finger 1422 along the previously described further path 1428 that is normal to the path 1406 at the current position 1408 of the movable portion (end point) 1404 of the curved line 1402. As the finger is moved to different input positions 1502, 1504, 1506, 1508, the pointer indicia 1426 may also move along the further path 1428 to illustrate the current selected amount of precision to move the end point 1404 based on movement of the user's finger in directions along (including parallel) to the path 1406 corresponding to the selected directions of constraint.

In this example, the distance between the input positions 1502-1508 and the movable portion (end point) 1404 along the direction normal (e.g., further path 1428) to the selected directions of constraint (e.g., along path 1406) corresponds to the selection of the degree of precision that the application software component causes the processor to move the movable portion (end point) 1404 in the selected directions of constraint in response to the motion inputs (e.g., motion of the finger touching the touch screen) being provided along the selected directions of constraint (which includes on and parallel to path 1406). Example embodiments of the application software component may cause numerical information 1510 to be displayed adjacent the further path indicia 1426 that is representative of the degree of precision based on the current distance between the input positions 1502-1508 of the motion inputs (e.g., finger touch motion) and the movable portion (end point) 1404 along the direction normal (e.g., further path 1428) to the selected directions of constraint (e.g., along path 1406).

In this example, the larger the distance (between the input positions 1502-1508 and the movable portion 1404) the larger the degree of precision. With larger degrees of precision, the application software component moves the movable portion (end point) 1404 on the workspace 114 smaller displacements (along path 1406) for an amount of displacement of the motion inputs (finger motion) in the directions of constraint (on or parallel to path 1406) on the workspace 114 compared to relatively larger displacements the movable portion (end point) 1404 is moved for the same amount of displacement of the motion inputs (finger motion) in the same directions of constraint for smaller degrees of precision.

The change in degree of precision may not be a linear function of the distance along the further path 1428, but rather may be a non linear function of the distance. For example, at some different intervals, the precision may increase by an additional order of magnitude. In FIG. 15 for example, the first input location 1502 (on the path) corresponds to a 1:1 ratio of movement of the finger to movement of the end point 1404 in which each 1 degree of movement of a finger along the path produces 1 degree of movement of the end point 1404. However, the second input location 1504 corresponds to a 1:2 ratio in which 1 degree of motion of the finger corresponds to 0.5 degrees of motion of the end point 1404 along the path. Also, the third input location 1506 (which is double the distance of the second input location 1504 from the end point 1404) corresponds to a 1:10 ratio in which 1 degree of motion of the finger corresponds to 0.1 degrees of motion of the end point 1404 along the path. Further, the fourth input location 1508 corresponds to a 1:100 ratio in which 1 degree of motion of the finger corresponds to 0.01 degrees of motion of the end point 404 along the path.

In example embodiments, the application software component may be operative to snap the amount of incremental precision for manipulating objects to particular amounts (such as those illustrated in FIG. 15 in the numeral indicia 1510), based on particular ranges of distance the input location (and pointer indicia 1426) is located along the distances normal to the directions of constraint. The amount of precision (i.e., snap increments) may then remain the same in these ranges until the input position (and pointer indicia 1426) is moved to the next range, in which the amount of precision snaps (i.e., jumps) to the amount of precision associated with that range of distances. The following table illustrates an example set of these snap increments for selecting degrees of precision.

| Normal distance from directions of constraint | Angular snap increment used for manipulating object for 1 degree of input motion | Linear snap increment used for manipulating object for 0.04 in. (1 mm) of input motion |
| --- | --- | --- |
| 0-1 inches (0-2.5 cm) | 1 degree | 0.04 inches (1 mm) |
| 1-2 inches (2.5-5.1 cm) | 0.5 degrees | 0.02 inches (.5 mm) |
| 2-3 inches (2.5-7.6 cm) | 0.1 degrees | 0.004 inches (.01 mm) |
| 3-4 inches (7.6-10.2 cm) | 0.01 degrees | 0.0004 inches (0.001 mm) |

In this example, when the user's input method (e.g., a finger, stylus, mouse pointer) is between 0 and 1 inches (in the normal direction) from the curved path of the line being drawn, the amount of precision is maintained in which 1 degree of motion of the user's input method (on or parallel to the curved path of the line being drawn) corresponds to 1 degree of motion of the end point 1404 along the path. However, when the user's input method moves between 1 and 2 inches (in the normal direction), the amount of precision snaps higher such that 1 degree of motion of the user's input method (parallel to the path of the line being drawn) corresponds to 0.1 degree of motion of the end point 1404 along the path.

It should also be appreciated that for straight directions of constraint, similar snap increments may be used such as shown in the above table. For example, for vertical directions of constraint and for inputs between 0-1 inches (0-2.5 cm) in the normal direction: every 0.04 inches (1 mm) of the user's input method (in vertical directions) may correspond respectively to 0.04 inches (1 mm) of incremental increases (or decrease) in the length of the line being drawn in the vertical directions. However, for the next snap increment for inputs between 1-2 inches (2.5-5.1 cm) in the normal direction: every 0.04 inches (1 mm) of the user's input method (in vertical directions) may correspond to 0.02 inches (0.5 mm) of incremental increases (or decreases) in the length of the line being drawn in the vertical directions.

In addition, it should be understood that as an object is being drawn/manipulated, the position of the movable portion of the object may be moved in snap increments according to the linear or angular increment associated with the particular range that is selected. Thus for straight directions of constraint, the object may increase or decrease in length by increments of at least 0.004 inches (0.01 mm) for input motions provided at distances of 1-2 inches (2.5-5.1 cm) in the normal direction to the end point of the line.

It should be appreciated that these described snap ranges/increments may be implemented in any displacement units, including increments expressed in terms of distance, arc distance, radial distance, scale, percentage, or other units relevant to the object, constraint, and type of manipulation being performed on the object.

In example embodiments, distances normal to the directions of constraint may be calculated using hardware or software units (e.g., pixels, mm, or other units) in such a manner that sufficient snapping increments are created that provide useful interaction for a given screen device size and type of input device being used. Further, illustrated in FIG. 15 the degree of precision for the current snap increment may be displayed via the numeral indicia 1510.

In the examples described herein, the processor may further be configured to dynamically cause the display device to display the measurement(s) that are being affected (e.g., lengths, angles, scales) and updating the displayed measurements in real-time by the snap increment as the objected is manipulated. For example, the length of an object being manipulated may be displayed, which progress from 35.1 to 35.2 to 35.3 mm, as the user moves the movable portion of the object along the path direction at 0.1 mm snap increments.

In addition, it should be appreciated that the user interface of the application software component 104 may include (in addition to the workspace 114) a configuration menu, window or other graphical user interface control that enables a user to set and modify the amounts and/or units of the snap increments and the different ranges (in normal directions) for the input motions, that corresponds to such snap increments.

It should also be understood that the described examples are also applicable to 3-D dimensional objects. Thus the described paths and directions of constraint may correspond to paths and directions that extend in three dimensions.

Figure 16:
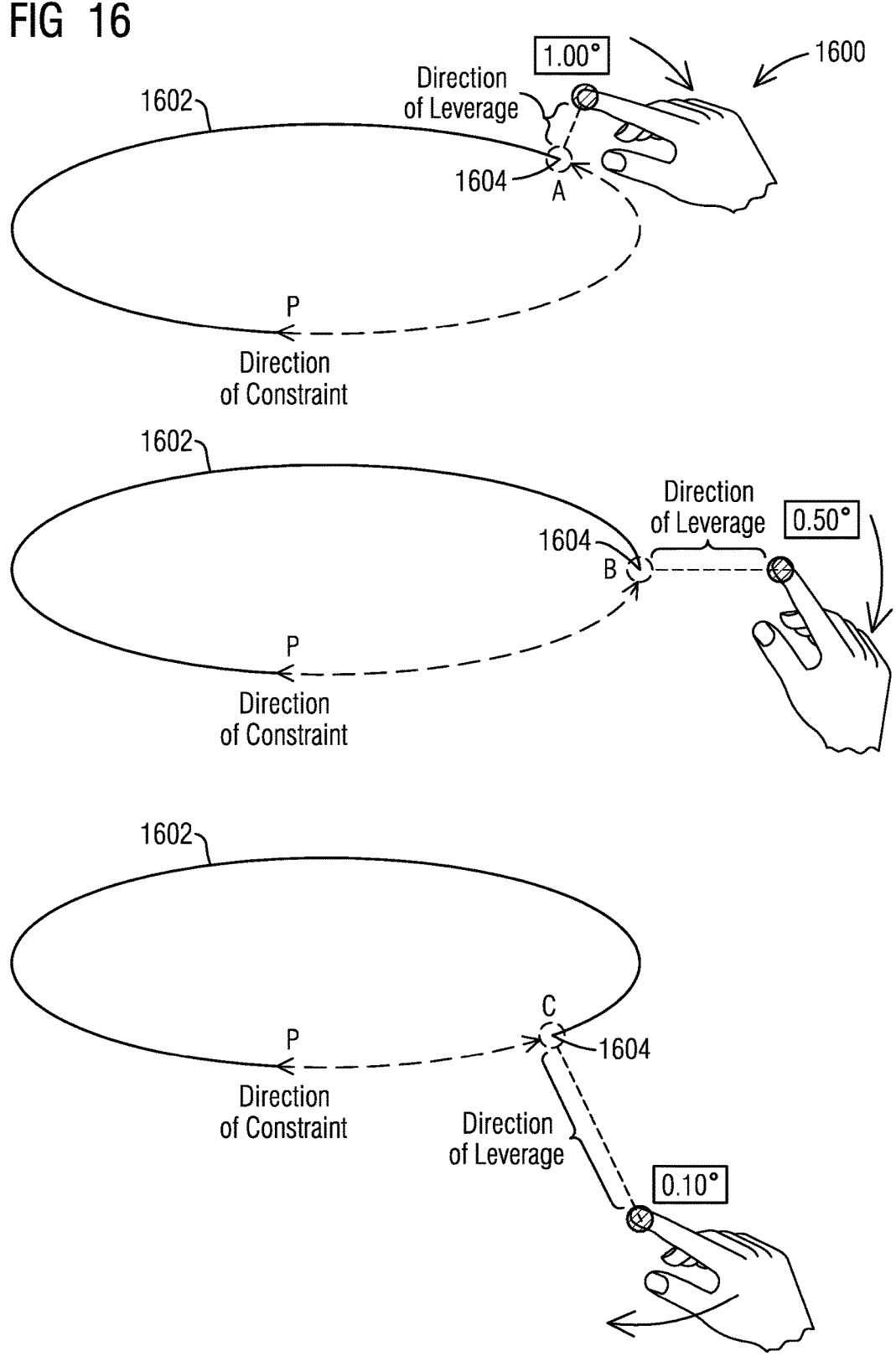
FIGS. 16 and 17 illustrate examples of changing the precision at which an object is drawn on a workspace with respect to an ellipse and a straight line segment.
Figure 17:
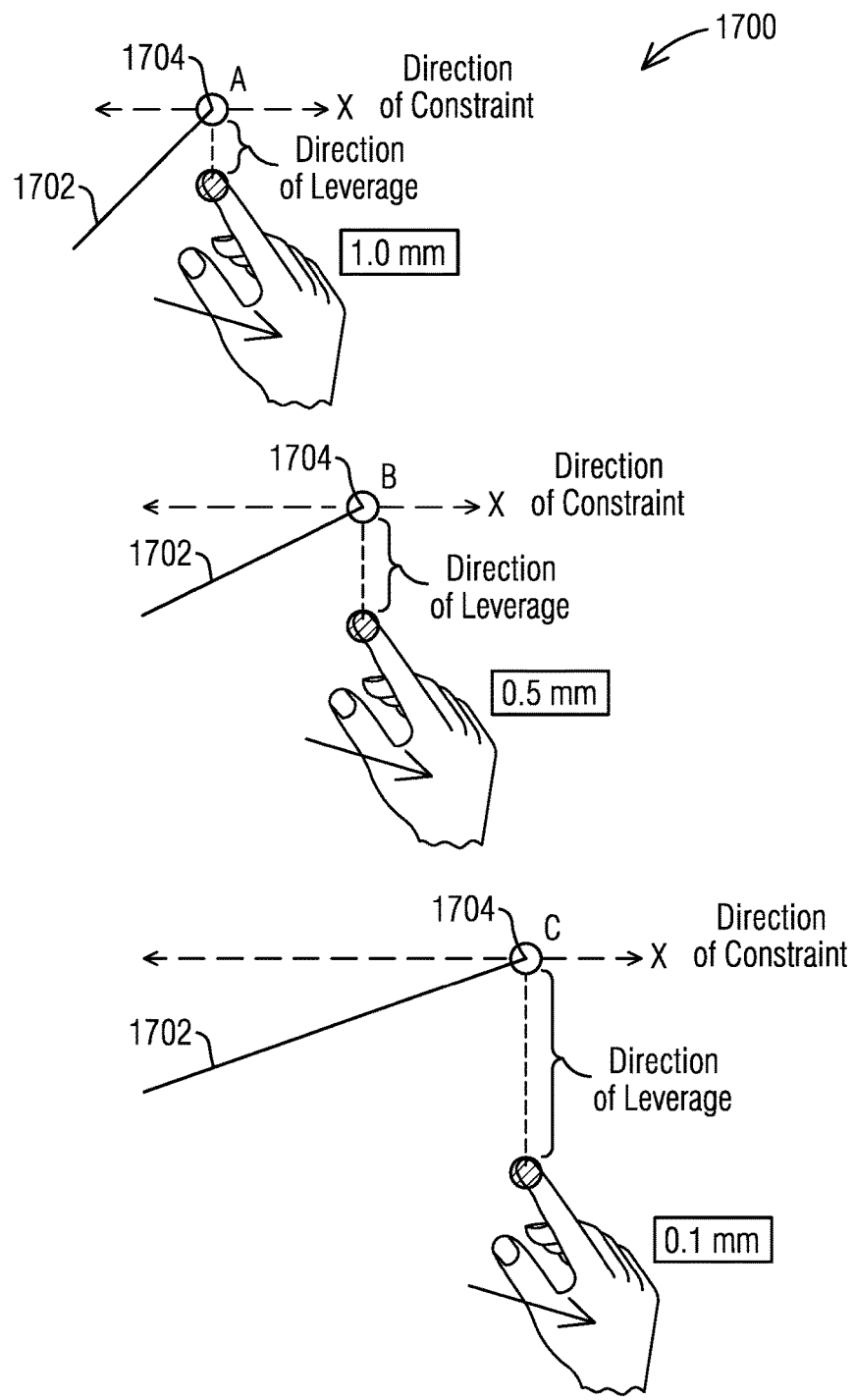

FIGS. 16 and 17 illustrate example views 1600, 1700 of this described process for changing the precision at which an object is drawn on a workspace with respect to an ellipse and 1602 a straight line segment 1702. In these examples, motion of the end points 1604, 1704 of these lines progresses from position A to position B to position C (or in the opposite direction from C to B to A). With the ellipse in FIG. 16, the motion is shown being constrained in the along path directions of constraint. With the straight line segment in FIG. 17, the motion is shown being constrained in the horizontal directions of constraint. As motion progresses from A to B to C, in this example the user increases their interaction distance normal to the directions of constraint. This described application software component is responsive to these selected directions of constraint and the increases in the interaction distance to invoke snap increments to the motion of the endpoints 1604, 1704 along the directions of constraint path that correspond to that shown in the above Table.

However, it should also be appreciated that embodiments may not use a small set of snap increment (such as the 4 increments shown in the above Table). Rather the degree of precision may change continuously based on the determined distance the user's input method (e.g., finger, stylus, mouse pointer) is away from the path in a direction normal to the directions of constraint at the current end point 1604, 1704.

In addition, it should be appreciated that the described system involving selectable directions of constraint may also be used to carry out any type of operation for which constraint of movement is desired. For example, a selection of directions of constraint and a selection of different levels of precision may be used to carry out operations such as move, extend, rotate, scale, resize, crop, skew, and/or any other operation on an object (or portions thereof) that can be constrained to follow a curvilinear path in which different levels of manipulation precision may be desired. Also it should be understood that for cases where an enter object is being moved according to a selected directions of constraint, the previously described movable portion may correspond to the entire object.

In the examples described herein an end point is shown as the movable portion of an object that has its motion constrained. However, it should be understood that in alternative embodiments, other portions of an object may be selected such as object corners, object centers, or any other portion and/or location associated with an object that can be moved to manipulate the object.

It should also be noted that the described application software component may enable the selected directions of constraint to be changed many times while an object is being manipulated. Thus, for example an initial X coordinate position for an endpoint of a line may be initially drawn by using a selected horizontal directions of constraints. Subsequently, the Y position for the endpoint of the line may be drawn by using a selected vertical directions of constraint.

Figure 18:
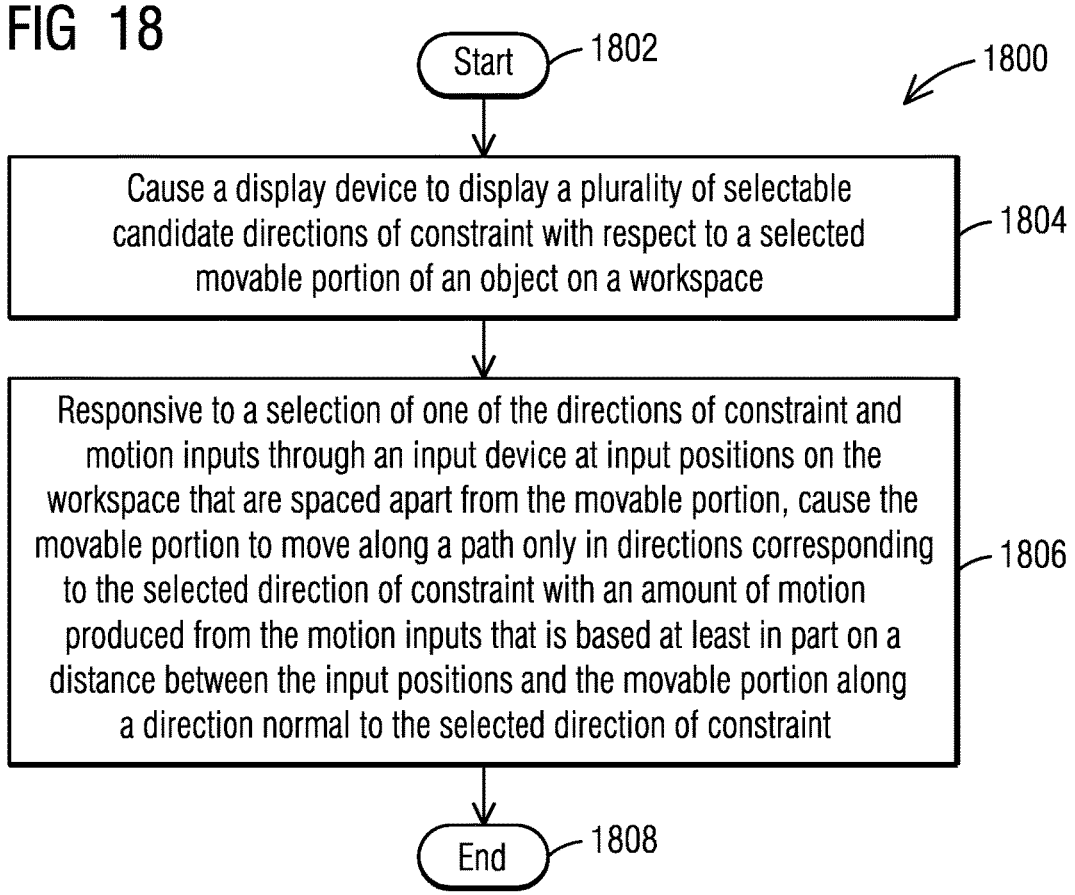
FIG. 18 illustrates a flow diagram of an example methodology that facilitates precise object manipulation.

With reference now to FIG. 18, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or signal bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Referring now to FIG. 18, a methodology 1800 that facilitates precise manipulation of objects is illustrated. The method may start at 1802 and at 1804 the methodology may include the act of through operation of at least one processor, causing a display device to display a plurality of selectable candidate directions of constraint with respect to a selected movable portion of an object being drawn on a workspace. Also at act 1806 the methodology may include through operation of the at least one processor responsive to a selection of one of the directions of constraint and motion inputs through an input device at input positions on the workspace that are spaced apart from the movable portion, causing the movable portion to move along a path only in directions corresponding to the selected directions of constraint with an amount of motion produced from the motion inputs that is based at least in part on a distance between the input positions and the movable portion along a direction normal to the selected directions of constraint. At 1808 the methodology may end.

In addition, the methodology 1800 may include other acts and features discussed previously with respect to the system 100. For example, as discussed previously the distance between the input positions and the movable portion along the direction normal to the selected directions of constraint corresponds to a selection of a degree of precision at which the movable portion moves in the selected directions of constraint in response to the motion inputs being provided along the selected directions of constraint. Thus the example methodology may further include moving the movable portion with a greater degree of precision responsive to further motion inputs at further input positions on the workspace that are further spaced apart from the movable portion in the direction normal to the selected directions of constraint.

In addition, the methodology may include causing path indicia to be displayed on the workspace extending from the movable portion, along which the movable portion is capable of moving. Further the methodology may include causing further path indicia to be displayed extending from the movable portion in at least one direction normal to the path indicia corresponding to the selected directions of constraint. Also, the methodology 1800 may include causing numerical information to be displayed adjacent the further path indicia that is representative of the degree of precision based on the current distance between the input positions of the motion inputs and the movable portion along the direction normal to the selected directions of constraint.

In further example embodiments, the methodology 1800 may include determining that the distance between the input positions and the movable portion along the direction normal to the selected directions of constraint falls into one of a plurality of predetermined ranges of distances. Also each of the plurality of predetermined ranges of distances may correspond to a different degree of precision. In this example, moving the movable portion with the greater degree of precision is carried out with a degree of precision based on which predetermined range of distances the determined distance falls within.

In addition, example embodiments of the methodology may include determining a type of an object being manipulated, and may include determining which selectable directions of constraint to display based at least in part on the determined type of the object. Such types of objects for example may correspond to a straight line, an arc, an ellipse, a circle, a spline, and/or any other type of object that is capable of being manipulated on a workspace. For example, other types of objects that may be manipulated on a workspace include images and text boxes.

As discussed previously, the selectable candidate directions of constraint that are displayed may include: vertical directions with respect to the workspace; and horizontal directions with respect to the workspace. Also in example embodiments, the methodology may include determining a path along which the movable portion may be moved that corresponds to a continuation of a shape of a line of the object of which the movable portion corresponds to an end portion. As a result, the selectable candidate directions that are displayed may further include: directions along the determined path; and directions normal to the determined path.

Further, an example of the methodology may include, determining a circular path along which the movable portion may move with the object serving as a radial arm with a fixed length that pivots with respect to a further portion of the object. As a result, the selectable candidate directions that are displayed may further include: directions along the circular path.

In addition, example embodiments of the methodology may further include changing at least one of the length, size, position, orientation, scale, or a combination thereof of at least portions of the object, which includes moving the movable portion of the object according to the selected directions of constraint.

As discussed previously, such acts associated with these methodologies may be carried out by one or more processors. Such processor(s) may be included in one or more data processing systems for example that execute software components operative to cause these acts to be carried out by the one or more processors. In an example embodiment, such software components may be written in software environments/languages/frameworks such as Java, JavaScript, Python, C, C#, C++ or any other software tool capable of producing components and graphical user interfaces configured to carry out the acts and features described herein.

Figure 19:
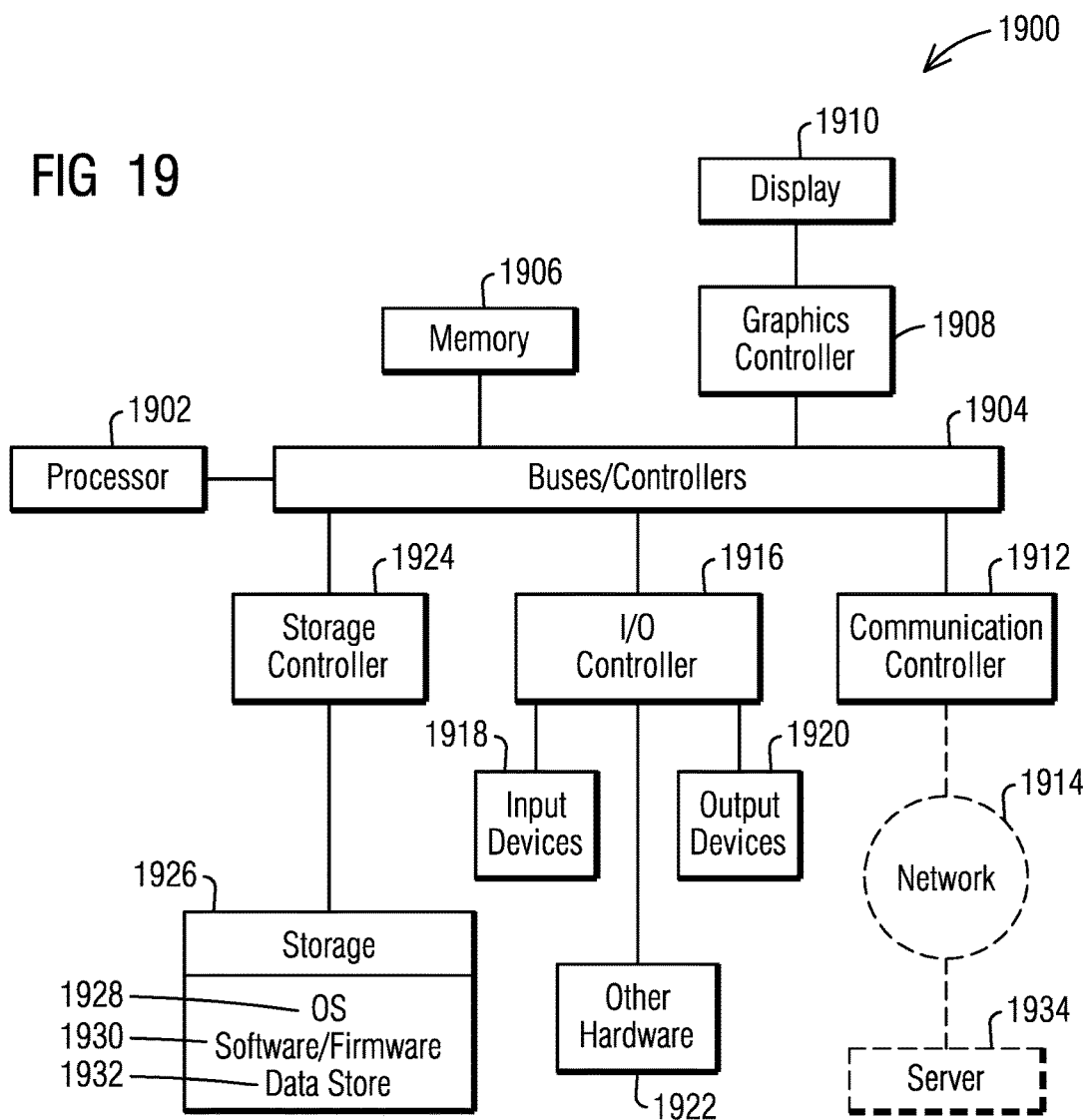
FIG. 19 illustrates a block diagram of a data processing system in which an embodiment can be implemented.

FIG. 19 illustrates a block diagram of a data processing system 1900 (also referred to as a computer system) in which an embodiment can be implemented, for example as a portion of a PLM, CAD, and/or drawing system operatively configured by software or otherwise to perform the processes as described herein. The data processing system depicted includes at least one processor 1902 (e.g., a CPU) that may be connected to one or more bridges/controllers/buses 1904 (e.g., a north bridge, a south bridge). One of the buses 1904 for example may include one or more I/O buses such as a PCI Express bus. Also connected to various buses in the depicted example may include a main memory 1906 (RAM) and a graphics controller 1908. The graphics controller 1908 may be connected to one or more display devices 1910. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1912 (Ethernet controllers, WiFi controllers, cellular controllers) operative to connect to a local area network (LAN), Wide Area Network (WAN), a cellular network, and/or other wired or wireless networks 1914 or communication equipment.

Further components connected to various busses may include one or more I/O controllers 1916 such as USB controllers, Bluetooth controllers, and/or dedicated audio controllers (connected to speakers and/or microphones). It should also be appreciated that various peripherals may be connected to the USB controller (via various USB ports) including input devices 1918 (e.g., keyboard, mouse, touch screen, trackball, camera, microphone, scanners), display devices 1920 (e.g., printers, speakers) or any other type of device that is operative to provide inputs or receive outputs from the data processing system. Further it should be appreciated that many devices referred to as input devices or display devices may both provide inputs and receive outputs of communications with the data processing system. Further it should be appreciated that other peripheral hardware 1922 connected to the I/O controllers 1916 may include any type of device, machine, or component that is configured to communicate with a data processing system.

Additional components connected to various busses may include one or more storage controllers 1924 (e.g., SATA). A storage controller may be connected to a storage device 1926 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 1904 such as a PCI Express bus.

A data processing system in accordance with an embodiment of the present disclosure may include an operating system 1928, software/firmware 1930, and data stores 1932 (that may be stored on a storage device 1926). Such an operation system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems.

The communication controllers 1912 may be connected to the network 1914 (not a part of data processing system 1900), which can be any public or private data processing system network or combination of networks, as known to those of skill in the art, including the Internet. Data processing system 1900 can communicate over the network 1914 with one or more other data processing systems such as a server 1934 (also not part of the data processing system 1900). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a disturbed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 1902 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example the data processing system 1900 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1900 may conform to any of the various current implementations and practices known in the art.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A system comprising:
at least one processor configured to:
    cause a display device to display a plurality of selectable candidate directions of constraint with respect to a selected movable portion of an object being on a workspace, and
    responsive to a selection of one of the directions of constraint and motion inputs through an input device at input positions on the workspace that are spaced apart from the movable portion, cause the movable portion to move along a path only in directions corresponding to the selected directions of constraint with an amount of motion produced from the motion inputs that is based at least in part on a distance between the input positions and the movable portion along a direction normal to the selected directions of constraint in the plane of the display device, thereby preventing the movable portion from moving in directions not corresponding to the selected directions.

2. The system according to claim 1, wherein the distance between the input positions and the movable portion along the direction normal to the selected directions of constraint corresponds to a selection of a degree of precision that the at least one processor causes the movable portion to move in the selected directions of constraint in response to the motion inputs being provided along the selected directions of constraint, wherein the larger the distance the larger the degree of precision, wherein with larger degrees of precision, the at least one processor moves the movable portion on the workspace smaller displacements for an amount of displacement of the motion inputs in the directions of constraint on the workspace compared to relatively larger displacements the movable portion moves for the same amount of displacement of the motion inputs in the same directions of constraint for smaller degrees of precision.

3. The system according to claim 2, wherein the at least one processor is configured to cause path indicia to be displayed on the workspace extending from the movable portion, along which the movable portion is capable of moving, wherein the at least one processor is configured to cause further path indicia to be displayed extending from the movable portion in at least one direction normal to the path indicia corresponding to the selected directions of constraint.

4. The system according to claim 3, wherein the at least one processor is configured to cause numerical information to be displayed adjacent the further path indicia that is representative of the degree of precision based on the current distance between the input positions of the motion inputs and the movable portion along the direction normal to the selected directions of constraint.

5. The system according to claim 4, wherein the at least one processor is configured to determine that the distance between the input positions and the movable portion along the direction normal to the selected directions of constraint falls into one of a plurality of predetermined ranges of distances, wherein each of the plurality of predetermined ranges of distances corresponds to a different degree of precision, wherein the at least one processor is configured to move the movable portion in snap increments corresponding to a degree of precision based on which predetermined range of distances the determined distance falls within.

6. The system according to claim 3, wherein the at least one processor is configured to determine a type of an object being manipulated, and determine which selectable directions of constraint to display based at least in part on the determined type of the object, wherein movement of the movable portion of the object according to the selected directions of constraint corresponds to an operation to change at least one of the length, size, position, orientation, scale, or a combination thereof of at least portions of the object.

7. The system according to claim 3, wherein the selectable candidate directions of constraint that the at least one processor is configured to cause to be displayed include: vertical directions with respect to the workspace; and horizontal directions with respect to the workspace.

8. The system according to claim 7, wherein the at least one processor is configured to determine a path along which the movable portion may be moved that corresponds to a continuation of a shape of a line of the object of which the movable portion corresponds to an end portion, wherein the selectable candidate directions of constraint that the at least one processor is configured to cause to be displayed include: directions along the determined path; and directions normal to the determined path.

9. The system according to claim 8, wherein the at least one processor is configured to determine a circular path along which the movable portion may move with the object serving as a radial arm with a fixed length that pivots with respect to a further portion of the object, wherein the selectable candidate directions of constraint that the at least one processor is configured to cause to be displayed include: directions along the circular path.

10. The system according to claim 3, further comprising a memory, an application software component, and a touch screen comprised of the input device and the display device, wherein the application software component is comprised of instructions that when included in the memory and executed by the at least one processor, cause the touch screen to display the selectable candidate directions of constraint and the line with the motion along the line path responsive to inputs received through a user touching the touch screen, wherein the application software component corresponds to a CAD software application that is operative to produce a CAD drawing based at least in part on the inputs through the touch screen.

11. A method comprising:
through operation of at least one processor, causing a display device to display a plurality of selectable candidate directions of constraint with respect to a selected movable portion of an object on a workspace,
through operation of the at least one processor responsive to a selection of one of the directions of constraint and motion inputs through an input device at input positions on the workspace that are spaced apart from the movable portion, causing the movable portion to move along a path only in directions corresponding to the selected directions of constraint with an amount of motion produced from the motion inputs that is based at least in part on a distance between the input positions and the movable portion along a direction normal to the selected directions of constraint in the plane of the display device, thereby preventing the movable portion from moving in directions not corresponding to the selected directions.

12. The method according to claim 11, wherein the distance between the input positions and the movable portion along the direction normal to the selected directions of constraint corresponds to a selection of a degree of precision at which the movable portion moves in the selected directions of constraint in response to the motion inputs being provided along the selected directions of constraint, wherein the larger the distance the larger the degree of precision, wherein with larger degrees of precision, the movable portion moves on the workspace with smaller displacements for an amount of displacement of the motion inputs in the directions of constraint on the workspace compared to relatively larger displacements the movable portion moves for the same amount of displacement of the motion inputs in the same directions of constraint for smaller degrees of precision, further comprising:
moving the movable portion with a greater degree of precision responsive to further motion inputs at further input positions on the workspace that are further spaced apart from the movable portion in the direction normal to the selected directions of constraint.

13. The method according to claim 12, further comprising:
through operation of the at least one processor, causing path indicia to be displayed on the workspace extending from the movable portion, along which the movable portion is capable of moving, and through operation of the at least one processor, causing further path indicia to be displayed extending from the movable portion in at least one direction normal to the path indicia corresponding to the selected directions of constraint.

14. The method according to claim 13, further comprising:
through operation of the at least one processor, causing numerical information to be displayed adjacent the further path indicia that is representative of the degree of precision based on the current distance between the input positions of the motion inputs and the movable portion along the direction normal to the selected directions of constraint.

15. The method according to claim 14, further comprising:
determining that the distance between the input positions and the movable portion along the direction normal to the selected directions of constraint falls into one of a plurality of predetermined ranges of distances, wherein each of the plurality of predetermined ranges of distances corresponds to a different degree of precision,
wherein moving the movable portion with the greater degree of precision is carried out by moving the movable portion in snap increments corresponding to a degree of precision based on which predetermined range of distances the determined distance falls within.

16. The method according to claim 11, further comprising:
through operation of the at least one processor, determining a type of an object,
through operation of the at least one processor, determining which selectable directions of constraint to display based at least in part on the determined type of the object, and
changing at least one of the length, size, position, orientation, scale, or a combination thereof of at least portions of the object, which includes moving the movable portion of the object according to the selected directions of constraint.

17. The method according to claim 16, wherein the selectable candidate directions of constraint that are displayed include: vertical directions with respect to the workspace; and horizontal directions with respect to the workspace.

18. The method according to claim 17, further comprising:
through operation of the at least one processor, determining a path along which the movable portion may be moved that corresponds to a continuation of a shape of a line of the object of which the movable portion corresponds to an end portion, wherein the selectable candidate directions that are displayed include: directions along the determined path; and directions normal to the determined path.

19. The method according to claim 18, further comprising:
through operation of the at least one processor, determining a circular path along which the movable portion may move with the object serving as a radial arm with a fixed length that pivots with respect to a further portion of the object, wherein the selectable candidate directions that are displayed include: directions along the circular path.

20. A non-transitory computer readable medium encoded with executable instructions that when executed, cause at least one processor to carry out a method comprising:
causing a display device to display a plurality of selectable candidate directions of constraint with respect to a selected movable portion of an object on a workspace,
responsive to a selection of one of the directions of constraint and motion inputs through an input device at input positions on the workspace that are spaced apart from the movable portion, causing the movable portion to move along a path only in directions corresponding to the selected directions of constraint with an amount of motion produced from the motion inputs that is based at least in part on a distance between the input positions and the movable portion along a direction normal to the selected directions of constraint in the plane of the display device, thereby preventing the movable portion from moving in directions not corresponding to the selected directions.

* * * * *